(12) United States Patent
Bühler (10) Patent No.: US 11,326,705 B2
(45) Date of Patent: May 10, 2022

(54) DIAPHRAGM VALVE AND A METHOD FOR MANUFACTURING A DIAPHRAGM VALVE

(71) Applicant: Festo SE & Co. KG, Esslingen (DE)

(72) Inventor: Andreas Bühler, Stuttgart (DE)

(73) Assignee: Festo SE & Co. KG, Esslingen (DE)

( * ) Notice: Subject to any disclaimer, the term of this patent is extended or adjusted under 35 U.S.C. 154(b) by 7 days.

(21) Appl. No.: 16/986,859

(22) Filed: Aug. 6, 2020

(65) Prior Publication Data

US 2021/0048116 A1 Feb. 18, 2021

(30) Foreign Application Priority Data

Aug. 12, 2019 (DE) .................. 10 2019 212 062

(51) Int. Cl.
*F16K 27/02* (2006.01)
*F16K 11/04* (2006.01)
*F16K 7/16* (2006.01)

(52) U.S. Cl.
CPC ............ *F16K 27/0236* (2013.01); *F16K 7/16* (2013.01); *F16K 11/04* (2013.01); *F16K 27/0263* (2013.01)

(58) Field of Classification Search
CPC ... F16K 7/14; F16K 7/16; F16K 11/04; F16K 11/044; F16K 11/052; F16K 11/0525; F16K 27/0236; F16K 27/0263; F16K 31/0624; F16K 31/0627; F16K 31/0641; F16K 31/0682; Y10T 137/86847; Y10T 137/86919

See application file for complete search history.

(56) References Cited

U.S. PATENT DOCUMENTS

| | | | | |
|---|---|---|---|---|
| 3,812,875 A | * | 5/1974 | Buhler | F16K 11/202 137/454.6 |
| 6,467,496 B2 | * | 10/2002 | Oestreich | F15B 13/0438 137/596.15 |
| 2003/0107018 A1 | * | 6/2003 | Hettinger | F16K 11/052 251/129.19 |
| 2010/0043738 A1 | * | 2/2010 | Grandvallet | F16K 31/10 123/90.39 |
| 2017/0314699 A1 | * | 11/2017 | Vogt | F16K 31/0679 |

FOREIGN PATENT DOCUMENTS

| | | |
|---|---|---|
| DE | 4222594 A1 | 1/1994 |
| DE | 4224389 A1 | 1/1994 |
| DE | 19854620 A1 | 6/2000 |
| DE | 102010006346 A1 | 9/2011 |
| DE | 202014103142 U1 | 8/2014 |
| EP | 1261825 B1 | 12/2002 |
| EP | 2817543 B1 | 12/2014 |

* cited by examiner

*Primary Examiner* — Hailey K. Do (74) *Attorney, Agent, or Firm* — Hoffmann & Baron, LLP (57) ABSTRACT

A diaphragm valve includes a valve housing in which a switching rocker, which is pivotable about a pivot axis and which interacts with a control diaphragm for opening and closing at least one valve channel, is arranged. The pivot axis is defined by a mounting web, on which the switching rocker bears in a pivotably movable manner. The mounting web is an integral constituent of a mounting unit, said mounting unit being fastened to the valve housing in a drive chamber by way of fastening measures. Without the fastening measures, the mounting unit can be displaced in order to adjust a desired height distance of the mounting web.

17 Claims, 4 Drawing Sheets

DIAPHRAGM VALVE AND A METHOD FOR MANUFACTURING A DIAPHRAGM VALVE

BACKGROUND OF THE INVENTION

The invention relates to a diaphragm valve, with a valve housing which delimits a housing interior, said housing interior being subdivided in a fluid-tight manner into a control chamber and a drive chamber by way of a flexible control diaphragm, wherein the control chamber is delimited by a base wall of the valve housing which lies opposite the control diaphragm in the height direction and through which several valve channels which open out into the control chamber pass and wherein a switching rocker which with drivingly interacts with the control diaphragm is arranged in the drive chamber, said switching rocker being pivotable to and fro relative to the valve housing about a pivot axis by way of a drive device by executing a switch-over movement, in order to deform the control diaphragm in a manner such that it selectively opens or closes at least one of the valve channels, wherein the pivot axis of the switching rocker is defined by a mounting web which forms an integral constituent of a mounting unit and on which the switching rocker is supported in a pivotably movable manner and which crosses through the drive chamber at a height distance to the base wall in a transverse direction perpendicular to the height direction, said mounting unit being fixed on the valve housing in an operating position. The invention further relates to a method for manufacturing such a diaphragm valve.

A diaphragm valve of the aforementioned type which is known from DE 20 2014 103 142 U1 has a valve housing which delimits a housing interior which is subdivided by way of a flexible control diaphragm into a control chamber which communicates with several valve channels and into a drive chamber, wherein a switching rocker which serves for actuating the control diaphragm is pivotably mounted in the drive chamber about a pivot axis. The switching rocker can be switched over between different switch positions by way of a drive device which is applied onto the valve housing at the top, in order to deform the control diaphragm such that one or more valve channels which open out into the control chamber are selectively opened or closed. A fluid flow can be controlled in this manner. The pivot axis is defined by a mounting web which crosses through the drive chamber and on which the switching rocker bears from above in a one-sided and pivotably movable manner. The mounting web is an integral constituent of a rod-like mounting unit which with end sections which are opposite one another is supported in a radially positive manner on all sides each in a wall opening of the valve housing. Since the mounting unit is fixed on a housing part other than that through which the valve channels pass, the manufacture of the diaphragm valve must be effected with tight tolerances, in order to avoid undesirable deviations in the height distance between the pivot axis and the channel orifices of the valve channels to be controlled, said height distance being provided for an orderly operation of the diaphragm valve. This entails high costs for the manufacture and the necessary quality assurance measures.

A similarly constructed diaphragm valve is known from EP 2 817 543 B1, wherein here the pivoting mounting of the switching rocker is effected by way of a mounting web which passes through the switching rocker.

A diaphragm valve, concerning which a switching rocker is pivotably mounted on a valve housing by way of laterally projecting bearing pins immersing into a recess which is formed in the joining region between two housing parts of the valve housing is known from EP 1 261 825 B1.

SUMMARY OF THE INVENTION

It is the object of the invention to take measures which assist in an inexpensive manufacture of a precisely operating diaphragm valve.

Given a diaphragm valve of the initially mentioned type, this object is achieved by way of the mounting unit which assumes the operating position being immovably fastened to the valve housing by way of fastening measures, wherein the mounting unit and the valve housing are designed in a manner matching one another such that without the fastening measures the mounting unit is steplessly displaceable in the height direction within the valve housing for setting a height distance of the mounting web which is assumed with respect to the base wall.

The object is further achieved by a manufacturing method of the initially mentioned type, concerning which one envisages the mounting unit in its operating position being fastened to the valve housing in an immovable manner by way of fastening measures, wherein the operating position is adjusted before carrying out these fastening measures, by way of the mounting unit being displaced in the height direction within the valve housing for adjusting a height distance of the mounting web which is desired with respect to the base wall.

In this manner, the operating position which is assumed by the mounting unit within the drive chamber is fixed by way of the mounting unit being immovably fastened to the valve housing by fastening measures. The operating position of the mounting unit which is fixed in such a manner corresponds to a desired height distance between the mounting web which belongs to the mounting unit, and a base wall of the valve housing, on which base wall the inner channel orifices of the valve channels which face the control chamber are located. The mentioned height distance defines the height position of the pivot axis above the base wall and is therefore of significance for the pivot angle which is available to the switching rocker given a switch-over movement. On account of the inventive measures, the mentioned height distance can be set in a very exact manner in accordance with requirements on manufacturing the diaphragm valve, so that the manufactured diaphragm valve provides a reliable closure function for closing the at least one valve channel as well as precise setting of the flow cross section which is available to the fluid to be controlled for its flow given an opened fluid channel. The mounting unit and the valve housing with regard to their design are matched to one another such that without the fastening measures, thus given the absence of fastening measures, the mounting unit can be displaced relative to the valve housing in the height direction. Herewith, on manufacturing the diaphragm valve, the height distance of the mounting web to the base wall and accordingly the height position of the pivot axis can be infinitely adjusted to the desired amount before the fastening measures which unchangeably fix the operating position of the mounting unit are subsequently carried out. The diaphragm valve can therefore be produced in an inexpensive manner without adhering to particularly tight manufacturing tolerances, but despite this in an exact manner, since the operating position of the mounting unit which is responsible for the position of the pivot axis can be adjusted or is adjusted directly on installing the switching rocker. Directly on manufacturing the diaphragm valve, one can set the pivot angle which is available to the switching rocker by way of a suitable adjustment of the mounting unit, which permits an advantageous application-specific design of the diaphragm valve. Since the assembly principle according to the invention requires no wall openings in the valve housing, the drive chamber can be shielded by the valve housing and the drive device very well with respect to the surroundings, so that the penetration of contamination which could compromise the functioning is not possible.

Advantageous further developments of the invention are to be derived from the dependent claims.

The fastening measures which are used for fastening the mounting unit to the valve housing are usefully of the material-fit or material bonded type. The fastening measures preferably consist solely of at least one material-fit connection, so that the fastening measures are of a purely material-fit type. The material-fit connection can be realised or become realised for example by way of a bonding connection between the mounting unit and the valve housing. However, a welding connection, concerning which the necessary strength is achieved within a shortest time, is seen as being particularly advantageous. In this context, a laser welding connection is seen as being particularly advantageous. The mounting unit and the valve housing at least in the region of the fastening measures and preferably as a whole consist of a plastic, so that preferably one falls back on a laser through-beam welding connection for realising the fastening measures.

The valve housing and the mounting unit are preferably adapted to one another such that the mounting unit which is fastened in the operating position does not experience a positive supporting in the height direction by the valve housing, such supporting supplementing the fastening measures. The stepless displacement of the mounting unit which is effected for the purpose of adjusting the height position of the operating position on manufacturing the diaphragm valve is not therefore restricted by any stop means which lie in the displacement path.

Another type of realisation of the fastening measures lies in a purely non-positive connection, concerning which the mounting unit is pressed into the valve housing up to the desired operating position.

The mounting unit is preferably received in its entirety in the drive chamber of the valve housing. By way of this, the housing wall of the valve housing can be completely without openings and designed in a closed manner.

The diaphragm valve has a transverse direction which is at right angles to the height direction. The diaphragm valve preferably has its smallest outer dimensions in the transverse direction. The mounting unit extends within the drive chamber preferably between two longitudinal-side wall sections which lie opposite one another in the transverse direction, of a housing wall of the valve housing which delimits the drive chamber, wherein it bears on the inner surfaces of these two longitudinal-side wall sections, said inner surfaces facing one another. Usefully, the fastening measures which ensure the immovable fastening are formed in the contact regions.

The mounting unit preferably has two fastening sections which are distanced to one another and between which the mounting web extends and amid whose involvement the mounting unit is fastenable or fastened to the valve housing in the desired operating position. The mounting web has two end sections which are opposite to one another and on which it is connected in each case to one of the fastening sections. The two fastening sections are fastened to the valve housing by the fastening measures. Usefully, an individual fastening measure is formed between each fastening section and the valve housing.

In the case of a particularly material-saving variant, a fastening section having the same outer contour as the mounting web connects axially onto the mounting web at both sides in each case with an axial extension, so that the complete mounting unit is designed in a rod-shaped or bar-like manner. However, in order for the fastening measures to have a very high strength, it is however advantageous if the fastening sections transversely to the pivot axis have a greater cross-sectional area than the mounting web.

In order to be able to carry out a particularly simple but precise height adjustment of the mounting unit, it is advantageous if a positioning structure is formed on the inner surface of the two longitudinal-side wall sections of the housing wall, by way of which positioning structure the assigned fastening section is displaceably guided in the height direction given not yet carried out fastening measures. The positioning structure supports the assigned fastening section of the mounting unit in a longitudinal direction which is at right angles to the height direction and the transverse direction. For example, each positioning structure consists of a longitudinal groove which extends in the height direction and into which the assigned fastening section positively engages. The longitudinal grooves are usefully open at their face side which is away from the control diaphragm, so that the mounting unit can be inserted axially without any problem on manufacturing the diaphragm valve.

The mounting unit can also be installed in a very precise manner even in the absence of a positioning structure if a suitably adapted machine appliance is used for the assembly.

The two fastening sections are usefully each designed in a rod-like manner and aligned such that their longitudinal extension runs parallel to the height direction of the diaphragm valve. Considered in the cross section, the rod-like fastening sections usefully have a rectangular profile even if other profilings are also possible.

It is considered to be particularly favourable if the mounting unit comprises a U-shaped, single-piece bow structure which has limbs which are connected to one another via a connection web, wherein the two fastening sections are formed by these two limbs of the bow structure. Such a mounting unit is particularly stable and can be adjusted in height in the drive chamber in a particularly precise manner on manufacturing the diaphragm valve before forming the fastening measures.

In the case of a preferred design of the diaphragm valve, the mounting web is formed directly by the connection web of the U-shaped bow structure. In this case, the mounting unit in particular consists exclusively of the U-shaped bow structure. Such a design is preferred if the pivot axis for the switching rocker is defined in that the switching rocker bears with its outer surface on the mounting web, so that it does not encompass the mounting web. For example, the switching rocker extends in a region between the control diaphragm and the connection web which functions as a mounting web, wherein it bears on the mounting web in the region which faces the control diaphragm. Herein, the switching rocker is useful pressed onto the mounting web by spring means.

Given an alternative design of the mounting unit, the mounting web is present additionally to the connection web of the U-shaped bow structure and extends at a distance to the connection web between the two limbs of the U-shaped bow structure which form the fastening sections. Such a construction shape is particularly recommended if the mounting web passes through the switching rocker in a manner such that the switching rocker is pivotably stuck onto the mounting web. The mounting web is preferably designed in a circularly cylindrical manner at least in this case.

The switching rocker and the mounting unit are preferably unified into an assembly before the assembly in the valve housing and then as a unit inserted into the valve housing. If required, the control diaphragm can also be a constituent of the assembly, wherein it is assembled on the switching rocker before it is attached to the valve housing.

Usefully, the channel orifice of at least one of the valve channels which open out into the control chamber is framed by a valve seat which is formed on the base wall and faces the control diaphragm. Under the influence of the switching rocker, the control diaphragm can be pressed onto the valve seat for closing the respective valve channel or can be lifted from the valve seat for opening the respective valve channel.

For example, only two valve channels open out into the control chamber, wherein only one valve seat is assigned to a valve channel. In the case of an alternative construction form, in total three valve channels open out into the control chamber, wherein an individual valve seat is then assigned to two of these valve channels.

In the case of a preferred construction of the diaphragm valve, the valve housing is constructed in a multi-part manner and has a first housing part and a second housing part which is applied onto the first housing part in the height direction. The first housing part comprises the base wall, through which the valve channels pass and on which possibly at least one valve seat is formed. The control diaphragm at its edge region is clamped between the first housing part and the second housing part in a fluid-tight manner, wherein together with the first housing part it delimits the control chamber and together with the second housing part it delimits the drive chamber. As a rule, the drive chamber is also yet delimited by the drive device which is assembled on the second housing part.

The drive device which serves for actuating the switching rocker is usefully attached on the valve housing at an upper side of the valve housing which faces the height direction, in a manner such that it closes an upper chamber opening of the drive chamber which lies opposite the control diaphragm and as mentioned likewise contributes to the delimitation of the drive chamber. The drive device has a movable drive member which projects through the chamber opening into the drive chamber and with regard to the drive interacts with the switching rocker, in order to create its switch-over movement and to set the desired switching position of the switching rocker.

The drive device is preferably an electromagnetic drive device which comprises an electromagnet, wherein the drive member is a solenoid armature which is movable by way of an alternating activation and deactivation of the electromagnet. Alternatively, the drive device can be for example of a piezoelectric nature.

Basically, the drive device can be fastened to the valve housing in an arbitrary manner. It has been found to be particularly advantageous if the drive device with a fastening structure immerses through the upper chamber opening into the drive chamber, wherein the fastening structure is fastened to a housing wall of the valve housing in an immovable manner in the height direction in a position of use by way of fastening measures which are independent of the fastening measures which relate to the mounting unit and which are denoted as further fastening measures. The drive device and the valve housing are designed in a manner matching one another such that the drive device in the absence of further fastening measures, thus given the absence of fastening measures, with its fastening structure is steplessly displaceable in the height direction within the drive chamber for adjusting a height distance of the drive member which is assumed with respect to the base wall. Here therefore, a fastening principle which is comparable with that of the mounting unit is applied. On manufacturing the diaphragm valve, the position of use of the drive device is adjusted before carrying out the further fastening measures, by way of the drive device being displaced relative to the valve housing in the height direction for setting a relative position with regard to height which is assumed with respect to the switching rocker. Due to the subsequently effected further fastening measure which in particular is of a material-fit nature, the drive device is immovably fixed in its position of use.

By way of this type of attachment of the drive device, there advantageously exists the possibility of carrying out an adjustment to the extent that an air gap is present between the drive member and the switching rocker given a deactivated drive device, said air gap ensuring that the switching rocker can reliably assume a basic position, in which it reliably holds the control diaphragm in its sealed closure position.

BRIEF DESCRIPTION OF THE DRAWINGS

The invention is hereinafter explained in more detail by way of the accompanying drawings. In these are shown in:

FIG. 1 an isometric representation of a diaphragm valve according to the invention, FIG. 2 a preferred embodiment of the diaphragm valve according to the invention, in a longitudinal section according to section line II-II of FIGS. 1, 3, and 4, FIG. 3 a cross section of the diaphragm valve of FIG. 2 according to section line of FIG. 2, FIG. 4 a further longitudinal section of the diaphragm valve in a section plane according to section line IV-IV of FIG. 3, said section plane being rotated by 90° with respect to FIG. 2, FIG. 5 an assembly which is contained in the magnet valve of FIGS. 2 to 4, consisting of a mounting unit, a switching rocker and a control diaphragm, in an isometric representation, FIG. 6 a further embodiment of a magnet valve which in its outer design corresponds to FIG. 1, in a longitudinal section according to section line IV-IV of FIG. 7, FIG. 7 a cross section of the magnet valve of FIG. 6 according to the section line VII-VII there, FIG. 8 a longitudinal section according to section line VIII-VIII of FIG. 7, said longitudinal section being rotated by 90 degrees with respect to FIG. 6, and FIG. 9 the magnet valve of FIGS. 6 to 8 in a partly not-yet assembled state during the manufacture.

DETAILED DESCRIPTION

The diaphragm valve which is represented in its entirety with the reference numeral 1 as essential components has a valve housing, 2 a control diaphragm 3 which function as a valve member, a switching rocker 4 which serves for actuation of the control diaphragm 3, and a drive device 5 which serves for actuating the switching rocker 4.

The diaphragm valve 1 further has a mounting unit 9, via which the switching rocker 4 is mounted in a manner in which it is pivotable with respect to the valve housing 2.

The valve housing 2 delimits a housing interior 6, in which the control diaphragm 3, the mounting unit 9 and the switching rocker 4 are received. The housing interior 6 has an interior opening 7 which is closed by the drive device 5 which is attached to the valve housing 2.

The valve housing 2 has an imaginary height axis 8 which simultaneously defines a height axis of the complete diaphragm valve 1. The axial direction of the height axis 8 is denoted as a height direction 8 amid the use of the same reference numeral.

Figure 1:
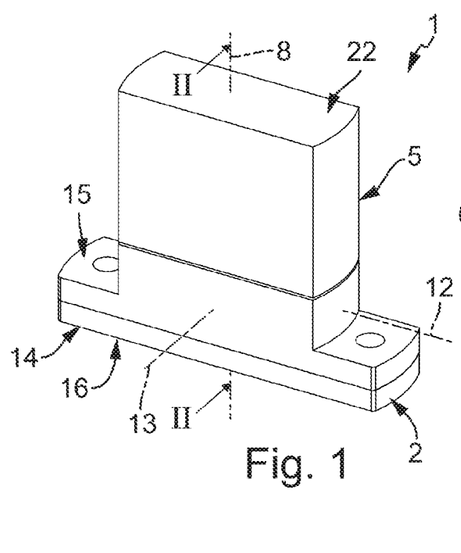
Figure 2:
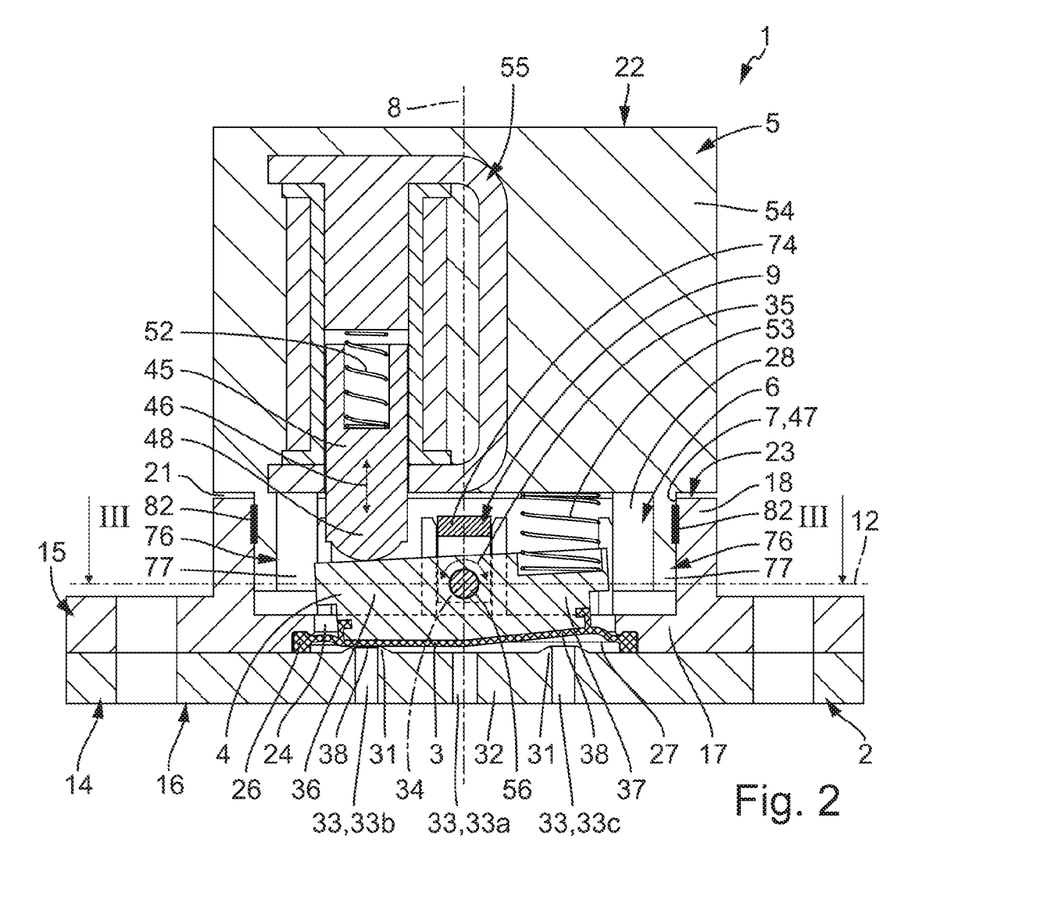
Figure 3:
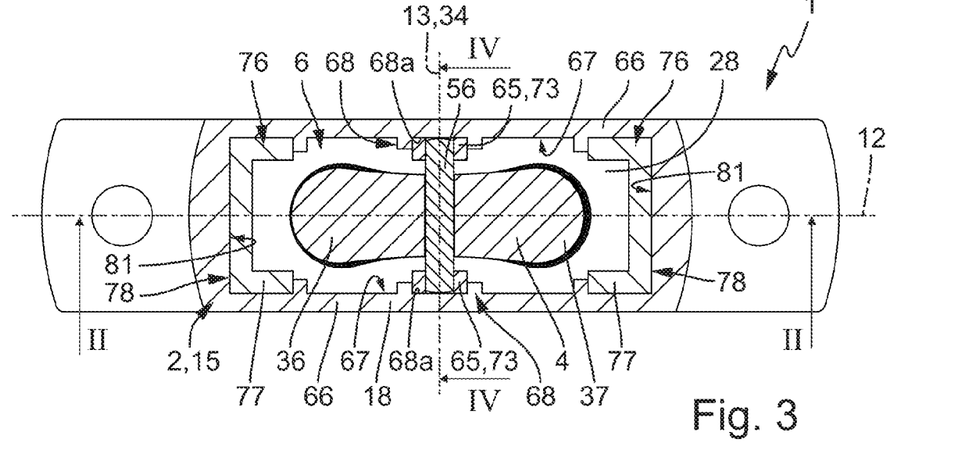
Figure 4:
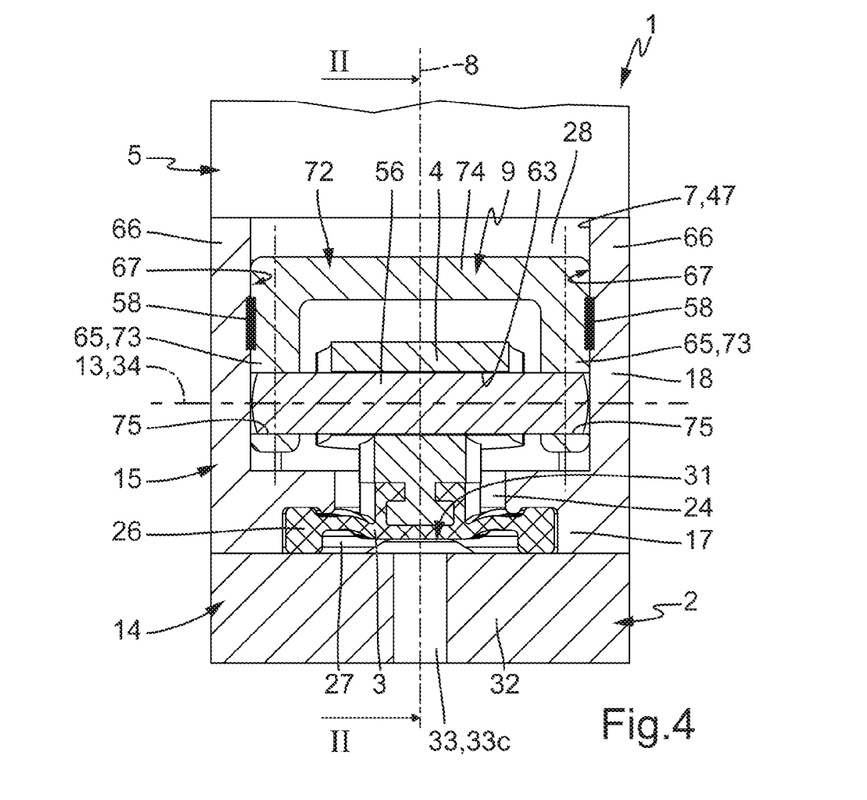
Figure 5:
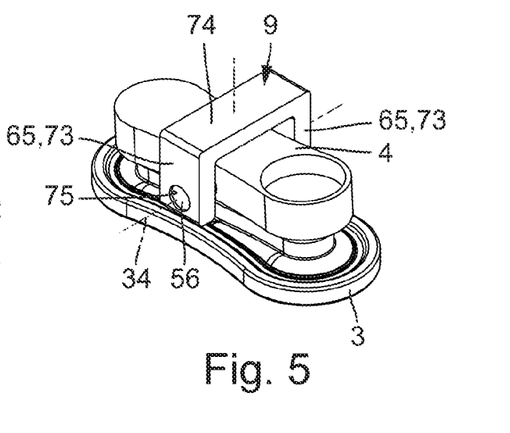
Figure 6:
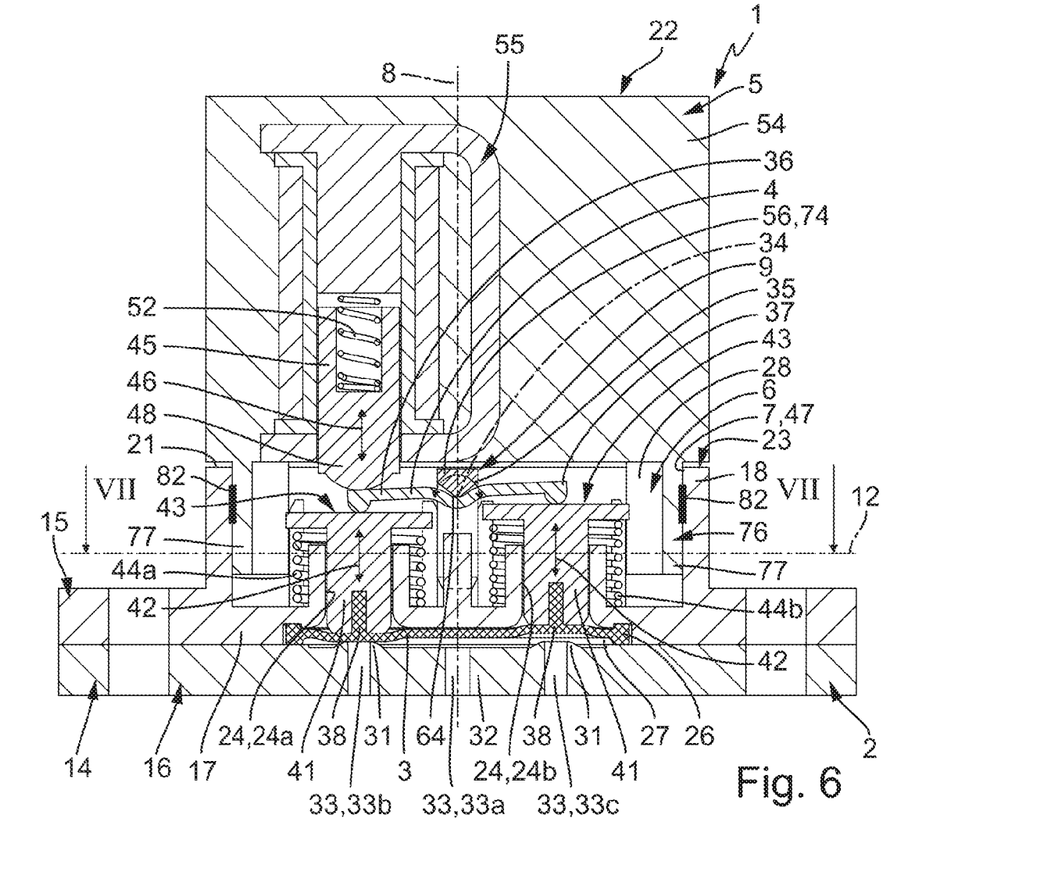
Figure 7:
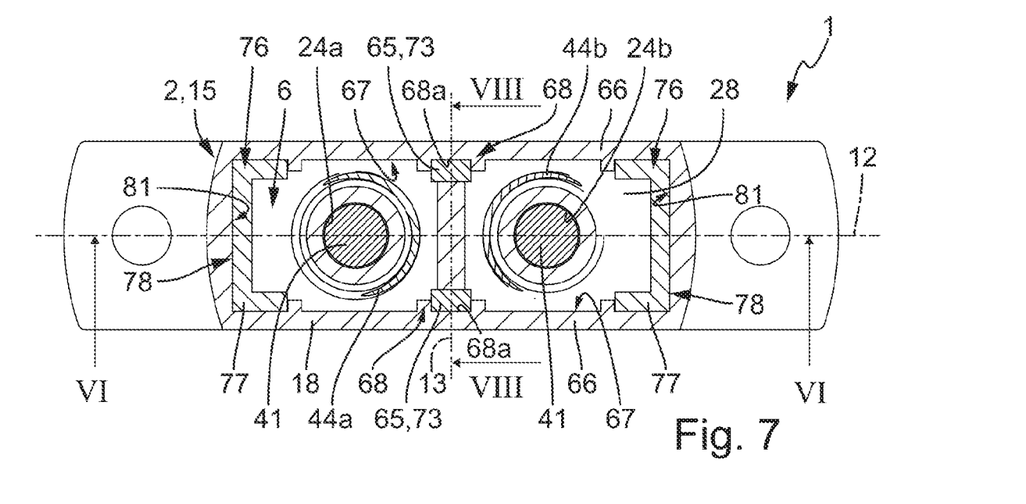
Figure 8:
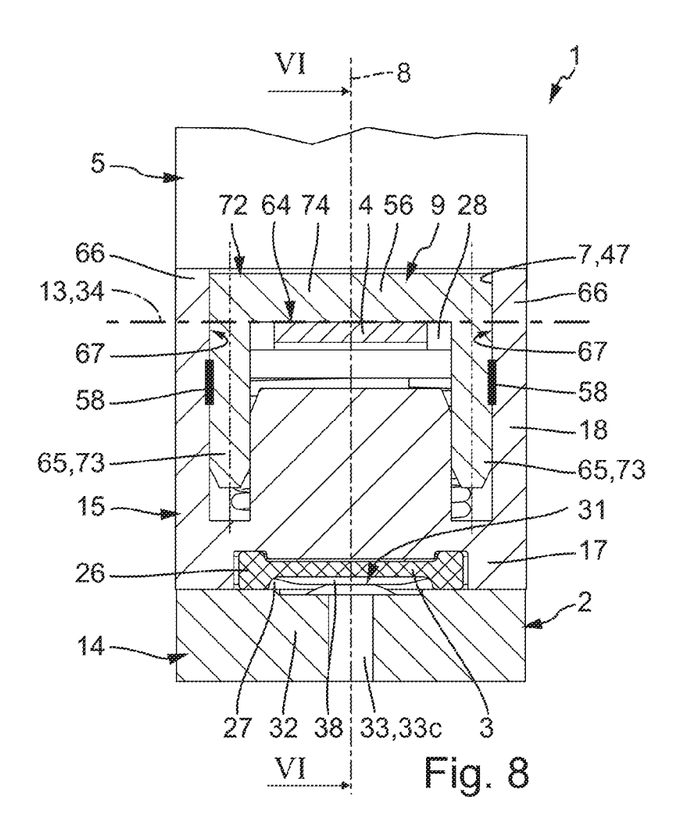

The valve diaphragm 1 further has a longitudinal axis 12 which is at right angles to the height axis 8 and which defines a longitudinal direction 12, as well as a transverse axis 13 which is at right angles to the height axis 8 and to the longitudinal axis 12 and which defines a transverse direction 13. The longitudinal sections which are shown in the FIGS. 2 and 6 each extend in a plane which is spanned by the height axis 8 and the longitudinal axis 12.

The valve housing 2 preferably has a multi-part construction. It has a first housing part 14 which is usefully designed in a plate-like manner and which by way of example is arranged on a lower side 16 of the diaphragm valve 1, so that here too it can be denoted as a housing lower part. The valve housing 2 furthermore has a second housing part 15 which connects onto the first housing part 14 in the height direction 8 and which is fixedly connected to the first housing part 14 in a manner which is not seen any further. For example, a weld connection or a screw connection is present.

The second housing part 15 has a base section 17 which bears on the first housing part 14 at its upper side which is orientated in the height direction 8. Furthermore, the second housing part 15 has a housing wall 18 which is designed in a frame-like manner, is designed as one piece with the base section 17 and projects away from the base section 17 in the direction of an upper side 22 of the diaphragm valve 1 which is opposite the lower side 16. The housing wall 18 frames the interior opening 7.

The drive device 15 at the upper side of the valve housing 2 is attached on the end region of the housing wall 18 which is opposite the base section 17, so that it covers the interior opening 7. The housing wall 18 has an upper face surface 23 which faces upwards away from the base section 17 and which frames the interior opening 7. The drive device 5 projects transversely to the height axis 8 in a region above the upper face surface 23, wherein however an air gap 21 remains between the upper face surface 23 and the drive device 5.

In the region which is framed by the lateral housing wall 18, the base section 17 comprises a wall opening 24 which is covered by the first housing part 14. By way of this, the housing interior 6 is delimited laterally by the housing wall 18 and at the lower side partly by the base section 17 and partly by the first housing part 14.

With regard to the embodiment example of FIGS. 2 to 5, the wall opening 24 is a continuous slot. Concerning the embodiment example of FIGS. 6 to 9, the wall opening 24 consists of two separate individual openings 24a, 24b which are arranged distanced to one another in the longitudinal direction 12.

A flexible diaphragm, concerning which it is the case of the already mentioned control diaphragm 3, is arranged between the two housing parts 14, 15. It extends in the region of the wall opening 24 transversely to the height axis 8, so that it closes the wall opening 24.

In the region of its annularly running outer edge section 26, the control diaphragm 3 is fixed to the valve housing 2 amid sealing, so that amid a sealing it subdivides the housing interior 6 into two housing chambers 27, 28 which lie above one another in the height direction and which are hereinafter denoted as a control chamber 27 and drive chamber 28 for a better differentiation. The wall opening 24 belongs to the drive chamber 28.

The control diaphragm 3 is preferably fixed on the valve housing 2 by way of it being clamped all around with its outer edge section 26 between the two housing parts 14, 15 with a simultaneous sealing effect.

The flexible control diaphragm 3 preferably consists of a material with rubber-elastic characteristics, in particular of an elastomeric material. Regions which are prone to wearing can be provided with reinforcement measures when required. The control diaphragm 3 is fluid-impermeable so that no fluid exchange can take place between the two control chambers 27, 28.

The control chamber 27 is commonly delimited by the control diaphragm 3 and by the wall section of the first housing part 14 which is covered by the control diaphragm 3 and which is hereinafter denoted as the base wall 32 of the valve housing 2. Usefully, the control diaphragm 3 extends in the region which is framed by the edge region 26, at a slight distance to the base wall 32.

Several valve channels 33 pass through the base wall 32, said channels each at one end running with inner channel orifices into the control chamber 27 and at the other end with outer channels leading out at the outer side of the first housing part 14. Fluid channels which lead further and which for example are formed in flexible fluid tubes or in other components and through which a fluid to be controlled can be fed and led away can be connected to the outer channel orifices of the valve channels 33.

By way of example, as a whole three valve channels 33 are present, concerning which it is the case of a non-controlled valve channel 33a and two controllable valve channels 33b, 33c. The non-controlled valve channel 33a is designed such that it constantly communicates with the drive chamber 28. The two controllable valve channels 33b, 33c can be selectively opened for a fluid passage or closed, depending on the deformation state of the control diaphragm 3. Its inner channel orifices are each framed by an annular valve seat 31 which is formed on the base wall 32 and projects in the direction of the control diaphragm 3. For closing one of the controllable valve channels 33b, 33c, the control diaphragm can be pressed onto the assigned valve seat 31 with a sealing effect under the influence of the switching rocker. 4. The control diaphragm can be lifted from the respective valve seat 31 for opening the respective controllable valve channel 33b, 33c.

A fluid flow between the momentarily open, controllable valve channel 33b or 33c and the non-controlled valve channel 33a, through the control chamber 27 can be effected in each case.

The switching rocker 4 is mounted in the control chamber 27 in a manner in which it is pivotable relative to the valve housing 2. The pivot axis is indicated in a dot-dashed manner at 34. The pivoting movement is hereinafter denoted as a switch-over movement 35 and is indicted by a double arrow.

The switch-over movement 35 is an alternating pivoting movement which takes place in an alternating manner in the clockwise and anti-clockwise direction. The pivot axis 34 runs in the transverse direction 13.

The switching rocker 4 has two first and second rocker arms 36, 37 which with respect to the pivot axis 34 project in different directions. Preferably, the two rocker arms 36, 37 project in directions which are opposite to one another with respect to the pivot axis 34.

An elastic, deformable control section 38 of the control diaphragm 3 lies opposite each valve seat 31. Each of the two rocker arms 36, 37 of the switching rocker 4 can act upon one of the two control sections 38 in a manner such this can either be pressed onto the assigned valve set 31 amid sealing or can lift or is lifted from the respective valve seat 31.

The switching rocker 4 is pivotable between two switching positions by way of the switch-over movement 35. The one control section 38 bears on the assigned valve seat 31 whereas the other control section 38 is lifted from the assigned valve seat 31, in each of these switching positions.

According to the embodiment example which is illustrated in FIGS. 2 to 5, the two rocker arms 36, 37 with regard to the drive can interact with the assigned control section 38 in a direct manner. For this, the switching rocker 4 bears with its two rocker arms 36, 37 on the two control sections 38 in a direct manner. The control diaphragm 3 is preferably fastened to the switching rocker 4 such that the control sections 38 given the switching movement 35 are actively moved either in the direction of the assigned valve seat or in the opposite direction. Alternatively, the control diaphragm 3 can also only loosely bear on the control diaphragm 3 at the side which faces the control chamber 27, so that the lifting from the valve seat is effected by the fluid pressure which prevails in the control chamber 27 when the assigned rocker arm 36, 37 distances itself from the valve seat 31.

According to the embodiment example which is illustrated in the FIGS. 6 to 9, an interaction with regard to drive and which is only indirect can also be present between the switching rocker 4 and the control diaphragm 3. In this case, a force transmission element 41 which is movable relative to the valve housing 2 in the height direction 8 is usefully arranged between each rocker arm 36, 37 and the control section 38 which is to be actuated by this rocker arm 36, 37. Preferably, each force transmission element 41 can execute a to and fro linear movement 42 which is indicated by a double arrow. By way of example, the force transmission elements 41 are designed in a plunger-like manner. Each force transmission element 41 extends in one of the individual openings 24a, 24b and is linearly displaceably guided by their delimitation surface. A lower end section of each force transmission element 41 which faces the control diaphragm 3, with regard to drive, is coupled to one of the control sections 38 and for example is fastened to this control section 38. An only loose bearing contact is also possible as an alternative.

Each rocker arm 36, 37 cooperates with one of the two force transmission elements 41. For this, the respective rocker arm 36, 37 projects into a region which in the height direction 8 is arranged in front of the force transmission element 41 to be actuated, at the face side which is away from the control diaphragm 3. There, each force transmission element 41 has a drive surface 43 which faces the drive device 5 and upon which the assigned rocker arm 36, 37 can act.

Each force transmission element 41 is biased in a direction which points away from the base wall 3 by way of one of two spring devices 44a, 44b. When the switching rocker 4 carries out the switch-over movement 35, it can displace the one force transmission element 41 in the direction of the base wall 32 whilst overcoming spring force which impinges this element, wherein the assigned control section 38 is pressed onto the opposite valve seat 31. The other force transmission element 41 simultaneously follows after the rocker arm 36 or 37 which moves upwards, on account of the spring force which impinges it, so that the assigned control section 38 can lift from the adjacent valve seat 31.

Concerning both illustrated embodiment examples, the switching rocker 4 can be pivoted to and fro between two switching positions, in which the two controllable valve channels 33b, 33c are opened and closed in an alternating manner. The switch-over movement 35 which is necessary for this is created by a drive member 45 of the drive device 5 which is movable in the height direction 8 and which can be driven into a to and fro drive movement 46 which is indicated by a double arrow. Concerning the drive movement 46, by way of example it is a linear movement which is parallel to the height axis 8, but it can also be for example a pivoting movement given a corresponding design of the drive device 5.

The interior opening 7 simultaneously forms an opening of the drive chamber 28 which points upwards in the height direction 8 and which is denoted as an upper chamber opening 47. The drive member 45 projects from above through the upper chamber opening 47 into the drive chamber 28 and, with a lower end section which is faces the base wall 32 and which is denoted as a drive section 48, is in the position of pressingly acting upon the upper side of the first rocker arm 36 which is away from the base wall 32.

The drive member 45 is preferably constantly biased in the direction of the first rocker arm 36 by way of a spring device of the drive device 5 which is hereinafter denoted as a drive spring 52. Given a deactivated drive device 5, the drive member 45 is displaced downwards in the direction of the base wall 32 by way of the drive spring 52, so that it pivots the switching rocker 4 into a first switching position which is evident from FIGS. 2 and 6 and in which the control section 38 which lies below the first rocker arm 6 closes the assigned controllable valve channel 33b.

Concerning the embodiment example of FIGS. 2 to 5, on switching over into the first switching position, the spring force of a spring device 53 which constantly acts upon the second rocker arm 37 and on account of this constantly biases the switching rocker 4 into the opposite second switching position is overcome by way of the drive spring 52. If the drive device 5 is activated and the drive member 45 is moved away from the base wall 32 by way of this, then the spring device 53 can bring about the switching over of the switching rocker 4 into the second switching position.

Concerning the embodiment example of FIGS. 6 to 9, the spring device 44a which is assigned to the first rocker arm 36 acts counter to the drive spring 52 and in the direction of the second switching position. The spring device 44b which is assigned to the second rocker arm 37 however assists the switching-over into the first switching position 8. The spring forces are designed such that in the deactivated state of the drive device 5 when the drive spring is ineffectual with regard to the switching rocker 4, the switching rocker 4 is pivoted by way of the spring device 44a which acts upon the first rocker arm 36, into the second switching position counter to the spring force of the other spring device 44b.

All spring devices 44a, 44b, 53 which have been described until now, as well as the drive spring 52 are preferably designed as compression springs.

The drive device 5 has a housing which is denoted as a drive housing 54 and via which it is fastened to the valve housing 2 and by way of example to the second housing part 15. An electrically actuatable actuator 55, to which the drive member 45 is assigned is located in the drive housing 54. By way of example, the drive device 5 is of an electromagnetic type, wherein the actuator 55 is an electromagnet and the drive member 45 is a solenoid armature which is movable by the electromagnet. In the activated state of the drive device 5, the drive member 45 is pulled upwards counter to the spring force of the drive spring 52 by way of the actuator 55. Given a deactivated drive device 5, the drive spring 52 presses the drive member 45 downwards against the first rocker arm 36.

Concerning an embodiment example which is not illustrated, the drive device 5 is of a piezoelectric construction type, wherein the drive member 45 is a piezo-transducer.

The pivot axis 34 for the switching rocker 4 is defined by a mounting web 56, on which the switching rocker 4 is supported in a pivotably movable manner. The mounting web 56 is an integral constituent of the mounting unit 9 which is immovably fasten to the valve housing 2 by way of fastening measures which are hereinafter denoted as first fastening measures 58. In this manner, the mounting web 56 is also fixed on the valve housing 2 in a stationary manner.

The position which is assumed by the mounting unit 9 in the operationally ready state of the diaphragm valve 1 is denoted as an operating position. This operating position defines a height distance of the mounting web 56 which is measured in the height direction 8 and therefore of the pivot axis 35 to the base wall 32 which comprises the at least one valve seat 31. The mounting web 56 crosses through the drive chamber 28 in the transverse direction 13 which is perpendicular to the height direction 8, at the height position which is defined by the aforementioned height distance.

A maximal pivot angle for the switch-over movement 35 of the switching rocker 4 is defined by the height distance between the pivot axis 34 and the base wall 32, said height distance being defined by the height position of the mounting web 56. The greater the distance of the pivot axis 35 and thus of the mounting web 56 to the base wall 32, the greater is this maximal pivot angle. The greater the maximal pivot angle, the further can the control sections 38 distance themselves from the assigned valve seat 31 with the switch-over movement 35 and the greater can be the free flow cross section which is made available to the fluid to be controlled for its flow.

A particularity of the diaphragm valve 1 lies in the fact that the bearing unit 9 and the valve housing 2 are designed in a manner in which they are matched to one another such that the mounting unit 9 without the fastening measures 58, thus before these fastening measures 58 are realised, can be steplessly displaced in the height direction 8 within the drive chamber 28. The height distance of the mounting web 56 which is assumed with respect to the base wall 32 and therefore the operating position of the mounting unit 9 can be adjusted by way of this stepless or continuously variable displaceability.

Figure 9:
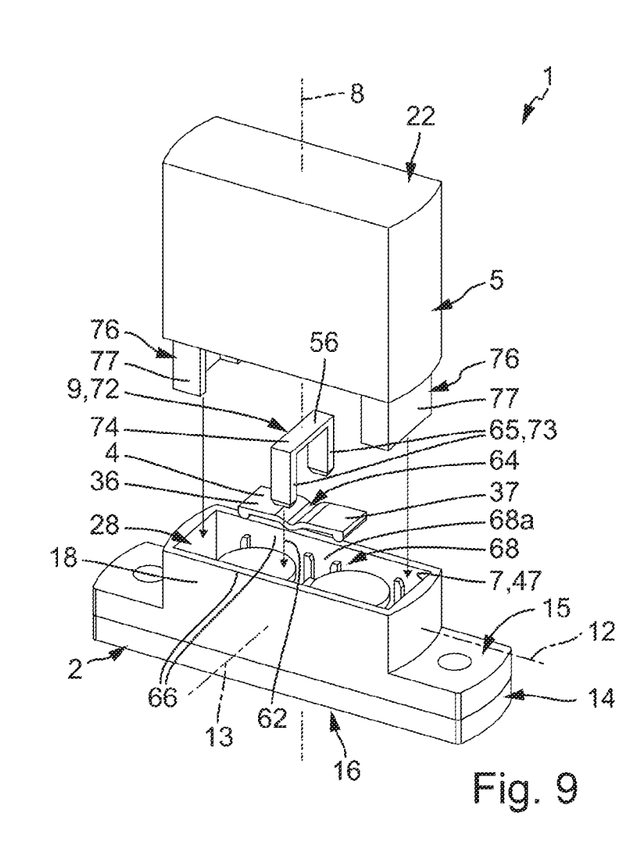

On manufacturing the diaphragm valve, the mounting unit 9 is inserted through the upper chamber opening 47 into the drive chamber 28 in the still disassembled state of the drive device 5—thus is indicated in FIG. 9 by the arrow 62 in the context of the embodiment example of FIGS. 6 to 9—and by way of displacing with regard to height is positioned such that the pivot axis 34 which is defined by the mounting web 5 assumes the desired height position. The first fastening measures are subsequently carried out in order to secure the set height position of the pivot axis 34 and hence to finally secure the operating position of the mounting unit 9 in an immovable manner with respect to the valve housing 2. Hence there exists the advantageous possibility of individually setting the maximum pivot angle of the switching rocker 4 directly on manufacturing the diaphragm valve 1. In this manner, greater manufacturing and assembly tolerances of the various components of the diaphragm valve 1 can be compensated.

Concerning the embodiment example of FIGS. 2 to 5, the mounting web 56 is formed by a circularly cylindrical element which passes through the switching rocker 4 with a small play, so that the desired pivoting movability of the switching rocker 4 is ensured. The switching rocker 4 for this purpose has a through-bore 63 which is radially closed all around. The pivot axis 34 coincides with the longitudinal axis of the mounting web 56 and the switching rocker 4 is supported on the mounting web 56 in all radial directions with respect to the pivot axis 34.

Concerning the embodiment example of FIGS. 6 to 9, the mounting web 56 extends beyond the switching rocker 4 at the upper side of the switching rocker 4 which is away from the base wall 32. The switching rocker 4 between the two rocker arms 36, 37 has a trough-like deepening 64 which at the longitudinal side is open to the top and into which the mounting web 56 immerses with its downwardly facing peripheral section. With the base surface of the trough-like deepening 64 which is formed by a part-surface of the outer surface of the switching rocker 4, the switching rocker 4 bears from below on the mounting web 56, wherein it is constantly pressed from below onto the mounting web 56 by the two force transmission elements 41 which are impinged by the spring devices 44a, 44b. Here, the linear contact region between the trough-like deepening 64 of the switching rocker 4 and the mounting web 56 defines the pivot axis 34.

The mounting unit 27 has two fastening sections 65 which are distanced to one another and between which the mounting web 56 extends and amid whose interaction or involvement the mounting unit 9 is fastened to the valve housing 2 by way of the first fastening measures 58.

The mounting unit 9 which is usefully received in the drive chamber 58 in its entirety extends in the transverse direction 13 between two longitudinal-side wall sections 66 of the housing wall 18 which lie opposite one another in this transverse direction 13, wherein it bears with the fastening sections 65 on the inner surfaces 67 of the longitudinal-side wall sections 66 which face one another.

Before the first fastening measures 58 are carried out, the mounting unit 9 with the two fastening sections 65 bears on the inner surfaces 67 in a slidingly displaceable manner.

Usefully, a positioning structure 68, with which the respectively assigned fastening section 65 is positively engaged is formed on the two aforementioned inner surfaces 67. A positive fit which is effectual in the longitudinal direction 12 sets the position of the mounting unit 9 which is assumed in the drive chamber 28 in the longitudinal direction 12, whereas a positive first which is effectual in the transverse direction 12 effects a transverse supporting of the mounting unit 9. This supporting is independent of whether the first fastening measures 58 are made or not. In particular, this results in the mounting unit 9 with its two fastening sections 65 being displaceable in the height direction 8 relative to the positioning structures 68 before carrying out the first fastening measures.

The positioning structures 68 preferably form linear guides for the fastening sections 65, so that the mounting unit 9 is displaceable in height in an exact manner in the non-fastened state without changing the longitudinal position or transverse position within the drive chamber 28. In this manner, the height position of the pivot axis 34 can be simply, quickly and exactly adjusted.

In accordance with the illustrated embodiment example, the positioning structures 68 can each comprise a longitudinal groove 68a which extends in the height direction 8 and into which the assigned fastening section 65 engages. On insertion, the fastening sections 65 can be inserted axially from above into these longitudinal grooves 68a which are open at the side of the upper chamber opening 47, according to arrow 62 of the mounting unit 9.

The longitudinal grooves 68a by way of example are formed in each case between two rib-like projections on the inner surface 67 of the longitudinal-side wall sections 66.

Usefully, the first fastening measures 58 are of a purely material-fit nature. In particular, they consist of at least one weld connection. Preferably, an individual first fastening measure 58 is formed between each fastening section 65 and the longitudinal-side wall section 66 which is adjacent with respect to this, concerning which fastening measure in both cases it is a laser through-beam weld connection. This weld connection is carried out by way of a laser beam through the lengthwise wall sections 65 which—as preferably the complete second housing part 15—consist of a plastic which is transparent to a laser beam. In contrast, the fastening sections 65 as preferably the complete mounting unit 9 consist of a plastic which absorbs a laser beam, so that a laser weld connection results in the contact region between the longitudinal-side wall sections 66 and the fastening sections 65.

Bonding connection can also be considered as alternative material-fit fastening measures 58.

Direct laser welding connections as first fastening measures 58 could be carried out in a very simple manner for example by way of a narrow slot which extends in the height direction 8 and through which the laser beam can be led passing through the longitudinal-side wall sections 66 in the region of the fastening sections 65.

The mounting unit 9 in its operating position is preferably unsupported in the height direction 8. This means that a continuously variable adjustment possibility with regard to height is given for the mounting unit 9 in a wide range before carrying out the first fastening measures 58.

In an advantageous construction which is realised with both embodiment examples, the mounting unit 9 has a single-piece, U-shaped bow structure 72 which consists of two limbs 73 which are parallel to one another and of a connection web 74 which connects the two limbs 73 to one another at an end region.

The two limbs 73 each form one of the two fastening sections 65 which are therefore each designed in a rod-like manner. The mounting unit 9 in its operating position is aligned such that the longitudinal extension of the two limbs 73 or fastening sections 65 coincides with the height direction 8.

The two limbs 73 usefully have a rectangular cross section. By way of this, they can be in contact with the inner surfaces 67 of the longitudinal-side wall sections 66 over a large area, which ensures a secure support.

Concerning the embodiment example of FIGS. 6 to 9, the mounting web 56 is formed directly by the connection web 74 of the bow structure 72. In this case, the mounting unit 9 usefully consists exclusively of a U-shaped bow structure. On manufacture of the diaphragm valve 1 according to FIG. 9, the bearing unit 9 which therefore as a whole is U-shaped is inserted from above with the free ends of the limbs 73 in front into the drive chamber 28 after the spring devices 44a, 44b, the force transmission elements 41 and the switching rocker 4 have previously already been inserted.

Concerning the embodiment example of FIGS. 2 to 5, the mounting web 56 is present additionally the U-shaped bow structure 72 and therefore additionally to this connection web 74. It extends in an alignment which is parallel to the connection web 74, between the two limbs 73 of the bow structure 72 which form the fastening sections 65.

Usefully, a through-hole 75 passes through each limb 73, wherein these two through-holes 75 are aligned with one another and wherein the mounting web 56 is inserted into the through-holes 75 of the limbs 73 such that it is held with an end section in each through-hole 75.

The mounting web 56 can be fixed on the assigned limb 73 in an axially non-displaceable manner in the region of at least one of its two end sections, for example by a bonding connection or a weld connection. However, such a fixation is not absolutely necessary since the axial position of the mounting web 56 within the drive chamber 58 is defined by the two longitudinal-side wall sections 66 whose clear distance to one another preferably corresponds at least essentially to the length of the mounting web 56.

On manufacturing the diaphragm valve 1 of the FIGS. 2 to 5, before the insertion of the separate mounting web 56, the switching rocker 4 is inserted between the two limbs 73 in a manner such that its through-bore 63 is aligned with the two through-holes 75. By way of this, given a subsequent insertion of the separate mounting web 56, the mounting unit 9 and the switching rocker 4 are joined together into an assembly which is evident from FIG. 5 and which subsequently as a unit is inserted through the upper chamber opening 47 into the drive chamber 38. If required, one can yet also fasten the control diaphragm 3 to the switching rocker 4.

Usefully, the drive device 5 is fastened to the second housing 2 and by way of example to its second housing part 15, according to the same basic principle as the mounting unit 9 is fastened to the valve housing 2

For this, the drive unit 5 at the lower side which faces the valve housing 2 has a fastening structure 76 which projects downwards from the drive housing 54 and which immerses through the upper chamber opening 47 into the drive chamber 28. The fastening structure 76 consists for example of two fastening projections 77 which are distanced to one another in the longitudinal direction 12 and whose shaping is adapted to the inner contour of the drive chamber 28 such that they bear with their outer surfaces 78 on the inner wall surface 81 of the housing wall 18. Preferably, several contact regions which are at right angles to one another are present between the fastening structure 76 and the inner wall surface 81, so that the drive device 5 is supported on the valve housing 2 in an immovable manner with respect to this in the longitudinal direction 12 as well as in the transverse direction 13.

The fastening structure 76 is fastened to the housing wall 18 in an immovable manner in the height direction 8 by way of further fastening measures which are independent of the first fastening measures 58 and which are denoted as second fastening measures 82. In this manner, a position of use of the drive device 5 which is assumed relative to the valve housing 2 is fixed.

The fastening structure 76 and the inner contour of the housing wall 18 are matched to one another such that the drive device 5 would be steplessly displaceable in the height direction 8 were the second fastening measures 82 not to be present.

On manufacture of the diaphragm valve 1, this is advantageously taken advantage of by way of the second fastening measures 82 not being carried out until the desired position of use of the drive device 5 has been set by way of a relative movement between the drive device 5 and the valve housing 2, said relative movement being effected in the height direction. It is not until after this position of use has been adjusted or set that the second fastening measures 82 are carried out.

A height distance of the drive member 545 which is assumed with regard to the base wall 32 can be set by way of the adjustment of the drive device 5 with regard to height before its fastening to the valve housing 2. Strictly speaking, it is the case of the setting of the relative position between the drive member 45 and the switching rocker 4, wherein the adjustment can be carried out in particular such that an air gap is present between these two components when the drive device 5 is activated and accordingly the drive member 45 is displaced to the top as far as possible.

By way of such an adjustment or setting, it is ensured that the control section 38 which is impinged by the second rocker arm 37 reliably closes the assigned controllable valve channel 33c when the drive device 5 is activated, and the pivot movement for instance is not blocked by the drive member 45.

The second fastening measures 82 can be realised in the same way and manner as the first fastening measures 58. That which has been stated further above is referred to for avoiding repetitions. It is particularly advantageous if the second fastening measures 82 also consist of at least one laser connection, in particular at least one laser welding connection and usefully at least one laser through-beam weld connection.

On manufacturing the diaphragm valve 1, the drive device 5 is displaced relative to the valve housing 2 until the desired position of use is reached, before realising the second fastening measures 82. This position of use is subsequently immovably fixed by the second fastening measures 82.

The air gap 21 which is mentioned further above, without the second fastening measures 82 ensures an uninhibited displaceability of the drive device 5 with respect to the valve housing 2 and in particular prevents the displaceability of the drive device 5 getting blocked before the position of use is reached. The drive device 5 and the valve housing 2 are coordinated with one another such that the mentioned air gap 21 is present at all events in the desired position of use.

What is claimed is:

1. A diaphragm valve comprising:
    a valve housing which delimits a housing interior, said housing interior being subdivided in a fluid-tight manner into a control chamber and a drive chamber, wherein the control chamber is delimited by a base wall of the valve housing and through which several valve channels pass which open out into the control chamber;
    a flexible control diaphragm dividing the housing interior into the control chamber and the drive chamber, the base wall of the housing lying opposite the flexible control diaphragm in a height direction;
    a switching rocker arranged in the drive chamber, the switching rocker interacting with the flexible control diaphragm in a driving manner and being pivotable to and fro relative to the valve housing about a pivot axis;
    a drive device for pivoting the switching rocker by performing a switch-over movement in order to deform the flexible control diaphragm in a manner such that it selectively opens or closes at least one of the several valve channels; and
    a mounting unit which crosses through the drive chamber at a height distance to the base wall in a transverse direction perpendicular to the height direction, said mounting unit being fixed on the valve housing in an operating position,
    wherein the pivot axis of the switching rocker is defined by a mounting web which forms an integral constituent of the mounting unit and on which the switching rocker is supported in a pivotably movable manner, and wherein the mounting unit which assumes the operating position is immovably fastened to the valve housing by way of fastening measures, wherein the mounting unit and the valve housing are designed in a manner matching one another such that, without the fastening measures, the mounting unit is steplessly adjustable in the height direction within the valve housing for setting a height distance of the mounting web which is assumed with respect to the base wall, and
    wherein the fastening measures are material-fit fastening measures, and
    wherein the material-fit fastening measures comprise at least one weld connection.

2. A diaphragm valve according to claim 1, wherein the valve housing supports the mounting unit in the height direction only by way of the fastening measures.

3. A diaphragm valve according to claim 1, wherein the mounting unit is received in its entirety in the drive chamber of the valve housing.

4. A diaphragm valve according to claim 1, wherein the mounting unit extends within the drive chamber between two longitudinal-side wall sections which lie opposite one another in the transverse direction, of a housing wall of the valve housing which delimits the drive chamber, wherein the mounting unit bears on inner surfaces of these two longitudinal-side wall sections, said inner surfaces facing one another.

5. A diaphragm valve according to claim 1, wherein the mounting web bears on an outer surface of the switching rocker or passes through the switching rocker.

6. A diaphragm valve according to claim 1, wherein a channel orifice of at least one of the several valve channels is framed in the control chamber by a valve seat which is formed on the base wall and faces the control diaphragm, wherein, under the influence of the switching rocker, the control diaphragm can be pressed onto the valve seat for closing the respective valve channel and can be lifted from the valve seat for opening the respective valve channel.

7. A diaphragm valve according to claim 1, wherein the valve housing comprises a first housing part which comprises the base wall through which the several valve channels pass, and a second housing part which is applied onto the first housing part in the height direction, wherein the control diaphragm at its edge region is clamped between the first housing part and the second housing part in a fluid-tight manner and together with the first housing part delimits the control chamber, wherein the drive chamber is delimited by the control diaphragm and by the second housing part.

8. A diaphragm valve according to claim 1, wherein the drive device which serves for actuating the switching rocker is attached to an upper side of the valve housing which faces the height direction, in a manner such that it closes an upper chamber opening of the drive chamber which lies opposite the control diaphragm and likewise contributes to the delimitation of the drive chamber, wherein the drive device comprises a movable drive member which projects into the drive chamber and which interacts with the switching rocker for creating the switch-over movement.

9. A diaphragm valve comprising:
    a valve housing which delimits a housing interior, said housing interior being subdivided in a fluid-tight manner into a control chamber and a drive chamber, wherein the control chamber is delimited by a base wall of the valve housing and through which several valve channels pass which open out into the control chamber;

a flexible control diaphragm dividing the housing interior into the control chamber and the drive chamber, the base wall of the housing lying opposite the flexible control diaphragm in a height direction;

a switching rocker arranged in the drive chamber, the switching rocker interacting with the flexible control diaphragm in a driving manner and being pivotable to and fro relative to the valve housing about a pivot axis;

a drive device for pivoting the switching rocker by performing a switch-over movement in order to deform the flexible control diaphragm in a manner such that it selectively opens or closes at least one of the several valve channels; and a mounting unit which crosses through the drive chamber at a height distance to the base wall in a transverse direction perpendicular to the height direction, said mounting unit being fixed on the valve housing in an operating position, wherein the pivot axis of the switching rocker is defined by a mounting web which forms an integral constituent of the mounting unit and on which the switching rocker is supported in a pivotably movable manner, and wherein the mounting unit which assumes the operating position is immovably fastened to the valve housing by way of fastening measures, wherein the mounting unit and the valve housing are designed in a manner matching one another such that, without the fastening measures, the mounting unit is steplessly adjustable in the height direction within the valve housing for setting a height distance of the mounting web which is assumed with respect to the base wall, and wherein the mounting unit comprises two fastening sections which are distanced to one another and between which the mounting web extends, wherein the mounting web comprises two end sections which are opposite to one another and on which the mounting web is connected in each case to one of the two fastening sections, wherein the two fastening sections are fastened to the valve housing by the fastening measures.

10. A diaphragm valve according to claim 9, wherein the two fastening sections are each rod-shaped and are aligned with a longitudinal extension which runs parallel to the height direction.

11. A diaphragm valve according to claim 9, wherein the mounting unit extends within the drive chamber between two longitudinal-side wall sections, which lie opposite one another in the transverse direction, of a housing wall of the valve housing which delimits the drive chamber, wherein the mounting unit bears on the inner surfaces of these two longitudinal-side wall sections, said inner surfaces facing one another, wherein a positioning structure is formed on each of the inner surfaces of the two longitudinal-side wall sections of the housing wall for positively supporting a respective fastening section of the mounting unit in a longitudinal direction which is at right angles to the height direction and to the transverse direction and by way of which, without the fastening measures, each fastening section is displaceably guided in the height direction with respect to the housing wall.

12. A diaphragm valve according to claim 11, wherein each positioning structure comprises a longitudinal groove which extends in the height direction and into which the assigned fastening section positively engages.

13. A diaphragm valve according to claim 9, wherein the mounting unit comprises a single-piece, U-shaped bow structure with two limbs which at one end are connected to one another by way of a connection web, wherein the two fastening sections are formed by the two limbs of the U-shaped bow structure.

14. A diaphragm valve according to claim 13, wherein the mounting web is formed directly by the connection web of the U-shaped bow structure.

15. A diaphragm valve according to claim 13, wherein the mounting web is present additionally to the connection web and extends at a distance to the connection web between the two limbs of the U-shaped bow structure which form the fastening sections.

16. A diaphragm valve comprising:

a valve housing which delimits a housing interior, said housing interior being subdivided in a fluid-tight manner into a control chamber and a drive chamber, wherein the control chamber is delimited by a base wall of the valve housing and through which several valve channels pass which open out into the control chamber;

a flexible control diaphragm dividing the housing interior into the control chamber and the drive chamber, the base wall of the housing lying opposite the flexible control diaphragm in a height direction;

a switching rocker arranged in the drive chamber, the switching rocker interacting with the flexible control diaphragm in a driving manner and being pivotable to and fro relative to the valve housing about a pivot axis;

a drive device for pivoting the switching rocker by performing a switch-over movement in order to deform the flexible control diaphragm in a manner such that it selectively opens or closes at least one of the several valve channels; and a mounting unit which crosses through the drive chamber at a height distance to the base wall in a transverse direction perpendicular to the height direction, said mounting unit being fixed on the valve housing in an operating position, wherein the pivot axis of the switching rocker is defined by a mounting web which forms an integral constituent of the mounting unit and on which the switching rocker is supported in a pivotably movable manner, and wherein the mounting unit which assumes the operating position is immovably fastened to the valve housing by way of fastening measures, wherein the mounting unit and the valve housing are designed in a manner matching one another such that, without the fastening measures, the mounting unit is steplessly adjustable in the height direction within the valve housing for setting a height distance of the mounting web which is assumed with respect to the base wall, and wherein the drive device which serves for actuating the switching rocker is attached to an upper side of the valve housing which faces the height direction, in a manner such that it closes an upper chamber opening of the drive chamber which lies opposite the control diaphragm and likewise contributes to the delimitation of the drive chamber, wherein the drive device comprises a movable drive member which projects into the drive chamber and which interacts with the switching rocker for creating the switch-over movement, and wherein the drive device with a fastening structure immerses through the upper chamber opening into the drive chamber, wherein the fastening structure is fastened to a housing wall of the valve housing which delimits the drive chamber, in an immovable manner in the height direction in a position of use by way of further fastening measures, wherein the fastening structure and the valve housing are designed in a manner matching one another such that without the further fastening measures the drive device with its fastening structure is steplessly displaceable in the height direction within the drive chamber for adjusting a height distance of the drive member which is assumed with respect to the base wall.

17. A diaphragm valve according to claim 16, wherein the further fastening measures are purely material-fit fastening measures.

* * * * *